Patented May 29, 1945

2,377,030

UNITED STATES PATENT OFFICE 2,377,030

STABILIZATION OF FATTY PRODUCTS

Frank A. Norris, Minneapolis, Minn., assignor to General Mills, Inc., a corporation of Delaware No Drawing. Application February 26, 1944, Serial No. 524,099

12 Claims. (Cl. 260—398.5)

The present invention relates to a process of stabilizing fatty or oleaginous products such as fats and oils, shortenings, salad dressings, spreads, and the like.

It has been found that a synergistic antioxidant effect is obtained by the combined use of an ethanolamine or a derivative thereof and a compound having the ene-diol grouping

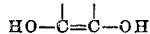

in such a fatty product. Ethanolamine compounds by themselves and the ene-diol compounds by themselves increase only slightly the stability of the fatty material. When used together, however, they were found to produce an increase in stability far in excess of that which would be expected were their effects merely additive.

The following table will serve to illustrate some of the results produced by the invention.

| Sample | "Swift" stability hours |
| --- | --- |
| (1) Rendered pork fat | 2.3 |
| (2) Rendered pork fat+.1% 1-ascorbic acid | about 11 |
| (3) Rendered pork fat+.1% monoethanolamine | 3.3 |
| (4) Rendered pork fat+.1% monoethanolamine+.1% 1-ascorbic acid | 44.5 |
| (5) Rendered pork fat+.1% diethanolamine | 1.8 |
| (6) Rendered pork fat+.1% diethanolamine+.1% 1-ascorbic acid | 68 |
| (7) Rendered pork fat+.1% triethanolamine | .5 |
| (8) Rendered pork fat+.1% triethanolamine+.1% 1-ascorbic acid | 27 |
| (9) Rendered pork fat+.1% morpholine | 1 |
| (10) Rendered pork fat+.1% morpholine+.1% 1-ascorbic acid | 55.5 |

It will be seen that the diethanolamine and the morpholine have the greatest synergistic effect when used with an ene-diol compound. The similarity of these compounds will be apparent when it is shown that morpholine may be considered as a dehydrated diethanolamine which, in fact, is the common method of preparing morpholine.

Other compounds besides 1-ascorbic acid which have the ene-diol grouping may be used in place thereof. Examples of such compounds are reductone, dihydroxy maleic acid, analogues or isomers of ascorbic acid, such as isoascorbic acid, glucoascorbic acid, araboascorbic acid, etc. Fat-soluble derivatives of these compounds in which the ene-diol grouping is preserved may also be used and the various terms used above are intended to include such derivatives. Examples of such fat-soluble derivatives are described in Oil and Soap, vol. 20, No. 11, pages 224–226, November 1943.

The rendered pork fat referred to in the table above was the crude commercial purchased as such and was employed without any additional purification. It will be apparent that the stability of such products may be further enhanced by commercial purification methods, including hydrogenation and the like. In order to maintain the stabilities of the products sufficiently low that they could be tested within a reasonable period of time, while at the same time demonstrating the efficacy of the present invention, these purification treatments referred to were not employed. In commercial practice, however, it will be understood that some of these treatments may be desirable, depending upon the use to which the product is to be put.

The fat-insoluble ene-diol compounds are preferably used in finely divided form and intimately dispersed in the fatty product. Where fat-soluble compounds are used, they may be distributed throughout the fatty product with greater facility.

While definite amounts of antioxidants were employed in the above tests, it will be apparent that the relative amounts thereof may be varied within considerable limits, depending upon the product to be stabilized, the extent of stability desired, cost, and other factors.

It is likewise to be understood that the invention is not limited to the fatty products specifically disclosed but may be employed on a product containing a substantial amount of fat subject to rancidity, whether of an edible nature or not, all of which products are contemplated by the term "fatty product" as used in the appended claims.

I claim as my invention:

1. A fatty product containing as antioxidants a compound having the ene-diol grouping and a compound selected from the group consisting of morpholine, mono-, di- and triethanolamines.

2. A fatty product containing as antioxidants 1-ascorbic acid and a compound selected from the group consisting of morpholine, mono-, di- and triethanolamines.

3. A fatty product containing as antioxidants a compound having an ene-diol grouping and diethanolamine.

4. A fatty product containing as antioxidants a compound having an ene-diol grouping and morpholine.

5. A fatty product containing as antioxidants 1-ascorbic acid and diethanolamine.

6. A fatty product containing as antioxidants 1-ascorbic acid and morpholine.

7. A fatty product containing as antioxidants 1-ascorbic acid and monoethanolamine.

8. Process of stabilizing fatty products against rancidity which comprises incorporating therein a compound having an ene-diol grouping and a compound selected from the group consisting of morpholine, mono-, di- and triethanolamines.

9. Process of stabilizing a fatty product against rancidity which comprises incorporating therein 1-ascorbic acid and a compound selected from the group consisting of morpholine, mono-, di- and triethanolamines.

10. Process of stabilizing a fatty product against rancidity which comprises incorporating therein 1-ascorbic acid and monoethanolamine.

11. Process of stabilizing a fatty product against rancidity which comprises incorporating therein 1-ascorbic acid and diethanolamine.

12. Process of stabilizing a fatty product against rancidity which comprises incorporating therein 1-ascorbic acid and morpholine.

FRANK A. NORRIS.